United States Patent
Nagy et al.

(10) Patent No.: US 11,767,408 B2
(45) Date of Patent: Sep. 26, 2023

(54) SUPPORTED METAL OXIDES AS DEPOLYMERIZATION CATALYSTS

(71) Applicant: Basell Poliolefine Italia S.r.l., Milan (IT)

(72) Inventors: Sandor Nagy, Seabrook, TX (US); Daniel F. White, Houston, TX (US); Christopher D. Smith, Kingwood, TX (US); Xueyong Yang, Bellaire, TX (US); David L. Ramage, Friendswood, TX (US)

(73) Assignee: Basell Poliolefine Italia S.r.l., Milan (IT)

( * ) Notice: Subject to any disclaimer, the term of this patent is extended or adjusted under 35 U.S.C. 154(b) by 68 days.

(21) Appl. No.: 17/514,015

(22) Filed: Oct. 29, 2021

(65) Prior Publication Data

US 2022/0135760 A1    May 5, 2022

Related U.S. Application Data

(60) Provisional application No. 63/108,150, filed on Oct. 30, 2020.

(51) Int. Cl.
    *C08J 11/16* (2006.01)

(52) U.S. Cl.
    CPC ............ *C08J 11/16* (2013.01); *C08J 2323/04* (2013.01)

(58) Field of Classification Search
    USPC .......................................... 521/47
    See application file for complete search history.

(56) References Cited

U.S. PATENT DOCUMENTS

2013/0317238 A1    11/2013    Mohanty et al.

FOREIGN PATENT DOCUMENTS

| CN | 107934938 A | 4/2018 |
| CN | 105348557 B | 11/2018 |
| JP | 2000219884 A | 8/2000 |
| PL | 210518 B1 | 1/2012 |
| WO | 9718892 A1 | 5/1997 |

OTHER PUBLICATIONS

PL210518B1 translated from Polish (Year: 2012).*
Onwudili et al.; Catalytic Supercritial Water Gasification of Plastics with Supported RuO2: A Potential Solution to Hydrocarbons-Water Pollution Problem, Process Safety and Environmental Protection, Institution of Chemical Engineers, Rugby, GB, vol. 102, Mar. 2, 2016, pp. 140-149, XP029644539, ISSN: 0957-5820, DOI: 10.1016/J.PSEP.2016.02.009.
The International Search Report and The Written Opinion for PCT/EP2021/080196 dated Feb. 18, 2022.

* cited by examiner

*Primary Examiner* — Terressa Boykin

(57) ABSTRACT

Methods of depolymerizing polyolefin-based material into useful petrochemical products using supported metal oxides and heat are described. The supported metal oxides improve the depolymerization reaction by decreasing the half time for the depolymerization, which results in a higher depolymerization rate and a shorter residence time in the depolymerization unit, allowing for a predictable depolymerization reaction, and decreasing the branching or aromatic formations in the product.

20 Claims, 1 Drawing Sheet

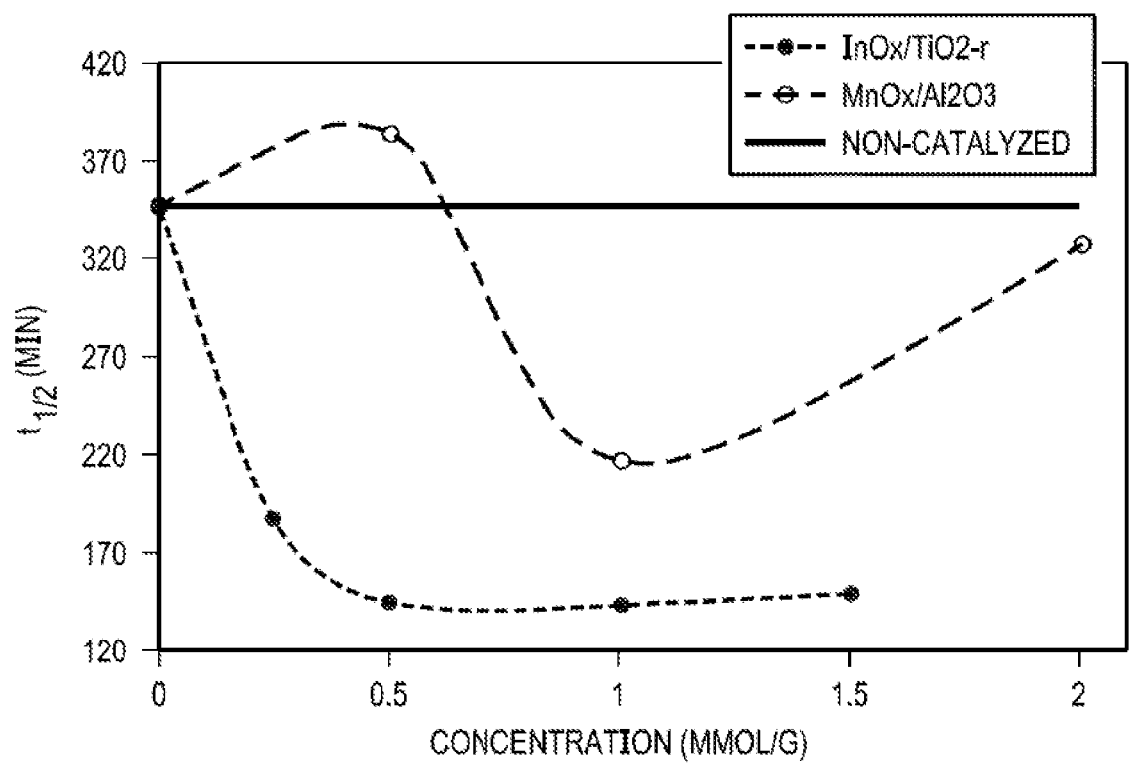

SUPPORTED METAL OXIDES AS DEPOLYMERIZATION CATALYSTS

PRIOR RELATED APPLICATIONS

This application claims the benefit of priority to U.S. Provisional Patent Application No. 63/108,150, filed on Oct. 30, 2020, which is incorporated herein by reference in its entirely.

FEDERALLY SPONSORED RESEARCH STATEMENT

Not applicable.

REFERENCE TO MICROFICHE APPENDIX

Not applicable.

FIELD OF THE DISCLOSURE

The disclosure relates to methods of depolymerizing polyolefin-based material using supported metal oxides and heat to form useful petrochemical products.

BACKGROUND OF THE DISCLOSURE

Heightened standards of living and increased urbanization have led to an increased demand for polymer products, particularly polyolefin plastics. Polyolefins have been frequently used in commercial plastics applications because of their outstanding performance and cost characteristics. Polyethylene (PE), for example, has become one of the most widely used and recognized polyolefins because it is strong, extremely tough, and very durable. This allows for it to be highly engineered for a variety of applications. Similarly, polypropylene (PP) is mechanically rugged yet flexible, is heat resistant, and is resistant to many chemical solvents like bases and acids. Thus, it is ideal for various end-use industries, mainly for packaging and labeling, textiles, plastic parts and reusable containers of various types.

The downside to the demand for polyolefin plastics is the increase in waste. Post-consumer plastic waste typically ends up in landfills, with about 12% being incinerated and about 9% being diverted to recycling. In landfills, most plastics do not degrade quickly, becoming a major source of waste that overburdens the landfill. Incineration is also not an ideal solution to treating the plastic wastes as incineration leads to the formation of carbon dioxide and other greenhouse gas emissions. As such, there has been much interest in developing methods of recycling plastic waste to reduce the burden on landfills while being environmentally friendly.

A drawback to the recycling of plastic wastes is the difficulty in successfully producing commercially usable or desirable products. Plastic waste recycling currently includes washing the material and mechanically reprocessing it; however, the resulting pellets remain contaminated with impurities such as food residue, dyes, and perfume. These impurities render the pellets undesirable for most uses based on both performance and appearance.

Recent advances have focused on converting plastic waste to useable products like fuel sources or commercially important raw material. Methods of performing pyrolysis of the plastic waste stream followed by catalytic depolymerization have been developed to generate various products: gases, gasoline fractions, kerosene fractions, diesel fractions and waxes.

Unfortunately, these processes are costly and time-consuming because they require a lot of energy to fully decompose polyolefin wastes to useful classes of products. Further, the reaction products themselves are unpredictable due to secondary reactions occurring under pyrolysis conditions, resulting in the formation of branched and aromatic products. The catalysts themselves also tend to be easily poisoned by impurities in the polymer feed.

Despite the advances made in recycling polymers, there is a continued need for the development of a robust process for the conversion of plastics to useful petrochemical products that minimizes formation of branched and/or aromatics products.

SUMMARY OF THE DISCLOSURE

The present disclosure provides improved methods for thermally depolymerizing polyolefin-based material. The improved methods rely on thermally depolymerizing a feed stream with one or more polyolefins in the presence of at least one supported metal oxide. Specifically, reducible metal oxide precursors such as nitrates and acetates are impregnated on supporting oxides. Small amounts of one or more of the supported metal oxides are mixed with a polyolefin-based material in a depolymerization unit and heated in the absence of oxygen. The supported metal oxide(s) initiates a depolymerization reaction that can proceed at a faster depolymerization rate (smaller depolymerization half time of reaction) than depolymerization reactions without the supported metal oxide. This depolymerization results in the formation of liquid products with minimal branching or aromatic formation. The liquid products can then be used as is, or undergo further processing in e.g. olefins crackers, to improve the feedstock.

The methods described herein can be used to treat any polyolefin-based material, including post-industrial waste and post-consumer use. Treatment of post-consumer polyolefin waste is of particular importance due to the overburdening of landfills and the potential to generate raw materials from the wastes. The methods described here relate to the processing of post-consumer waste after it has been sorted by the processing center at a landfill, or other recycling center, to separate polyolefin-based materials from other recyclable materials such as glass, cellulose (paper), polyvinyl polymers, and the like.

The present disclosure includes any of the following embodiments in any combination(s):

A method of depolymerizing polyolefins comprising adding a polyolefin-based feed stream and at least one supported metal oxide to a reactor heated to temperature between about 200 and about 600° C.; and reacting the polyolefin-based feed stream with the at least one supported metal oxide to depolymerize the polyolefin-based feed stream.

A method of depolymerizing polyolefins comprising adding a polyolefin-based feed stream and at least one supported metal oxide to a reactor heated to a predetermined temperature, wherein the supported metal oxide is present in an amount between greater than 0% and about 20% by weight of the polyolefin-based feed stream; and reacting the polyolefin-based feed stream with the at least one supported metal oxide to depolymerize the polyolefin-based feed stream.

A method of depolymerizing polyolefins comprising adding a polyolefin-based feed stream and at least one supported metal oxide to a reactor heated to a predetermined temperature; and reacting the polyolefin-based feed stream with the at least one supported metal oxide to depolymerize the polyolefin-based feed stream, wherein the rate of depolymerization of the polyolefin-based feed stream is at least 20% greater, or faster, than the rate of depolymerization for the polyolefin-based feed stream without the at least one supported metal oxide.

A method of depolymerizing polyolefins comprising adding a polyolefin-based feed stream and at least one supported metal oxide to a reactor heated to a predetermined temperature between about 200 and about 600° C., wherein the polyolefin-based feed stream comprises post-industrial waste, post-consumer waste, or both; and reacting the polyolefin-based feed stream with the at least one supported metal oxide to depolymerize the polyolefin-based feed stream. In some embodiments, the rate of depolymerization of the polyolefin-based feed stream using this method is at least 20% greater, or faster, than the rate of depolymerization for the polyolefin-based feed stream without the at least one supported metal oxide.

Any of the methods herein described, wherein the metal oxide in the at least one supported metal oxide is $ScO_x$, $ZrO_x$, $WO_x$, $MnO_x$, $NiO_x$, or $InO_x$.

Any of the methods herein described, wherein the support in the at least one supported metal oxide is $SiO_2$, $TiO_2(a)$, $TiO_2(r)$ or $Al_2O_3$.

Any of the methods herein described, wherein the at least one supported metal oxide is chosen from a group consisting of $ZrO_x/SiO_2$, $InO_x/TiO_2(r)$, $InO_x/TiO_2(a)$, $WoO_x/SiO_2$, $ScO_x/SiO_2$, $MnO_x/SiO_2$, and $NiO_x/SiO_2$.

Any of the methods herein described, wherein the polyolefin-based feed stream is a low density polyethylene, a high density polyethylene, a polypropylene, or a combination thereof.

Any of the methods herein described, wherein the polyolefin-based feed stream is post-consumer waste.

Any of the methods herein described, wherein the polyolefin-based feed stream is post-industrial waste.

Any of the methods herein described, wherein the polyolefin-based feed stream comprises both post-industrial waste and post-consumer waste.

Any of the methods herein described, wherein the rate of depolymerization in the presence of at least one supported metal oxide is at least 20% more than the rate of depolymerization of the polyolefin-based feed stream without the at least one supported metal oxide.

Any of the methods herein described, wherein rate of depolymerization in the presence of at least one supported metal oxide is 40% more than the rate of depolymerization of the polyolefin-based feed stream without the at least one supported metal oxide.

Any of the methods herein described, wherein the supported metal oxide is present in an amount between greater than 0% and about 20% by weight of the polyolefin-based feed stream.

Any of the methods herein described, wherein the supported metal oxide is present in an amount between about 2.5 and 15% by weight of the polyolefin-based feed stream.

Any of the methods herein described, wherein the supported metal oxide is present in an amount of about 10% by weight of the polyolefin-based feed stream.

Any of the methods herein described, wherein the predetermined temperature is between about 200 and about 600° C.

Any of the methods herein described, wherein the predetermined temperature is between about 250 and about 450° C.

Any of the methods herein described, wherein the predetermined temperature is about 400° C.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The FIGURE provides a comparison of the performance of exemplary supported metal oxides of the present disclosure in depolymerizing a polyolefin feed.

DEFINITIONS

As used herein, "on-set temperature" means the temperature at which liquid products are first observed in laboratory scale depolymerization units. A lower "on-set temperature" translates into less energy needed to perform the depolymerization reaction. This temperature correlates to the operational temperature of an industrial scale depolymerization unit.

As used herein, "residence time" refers to the time needed to depolymerize a batch of polymer waste in a depolymerization unit.

As used herein, the terms "depolymerization half time" or "half time of depolymerization" refer to the time needed to achieve a 50% loss of mass of a sample at a specific temperature during a TGA thermolysis reactions.

As used herein, "thermolysis" refers to a thermal depolymerization reaction occurring in the absence of oxygen.

As used herein, "post-consumer waste" refers to a type of waste produced by the end consumer of a material stream.

As used herein, "post-industrial waste" refers to a type of waste produced during the production process of a product.

As used herein, "supported metal oxide" refers to metal oxides impregnated on support oxides. Any method of synthesizing the supported metal oxides can be used. One such method is an "incipient wetness impregnation" procedure. Incipient wetness impregnation is particularly suitable for porous support materials such as the oxides used herein and comprises mixing the support material with a metal precursor dissolved in a solution. This procedure minimizes the quantity of solvent used to prepare the supported metal oxides, and remove during the drying process, by using only a sufficient amount of the metal precursor solution to fill the pores of the support. Another suitable method includes solid state synthesis such as co-milling of solid support and solid salts without a solvent, or with minimal solvent.

In this disclosure, the description of the chemical formula or nomenclature recites the metal oxide before the support metal oxide with a slash mark in between: metal oxide/support metal oxide. By way of example, $ZrO_x/SiO_2$ means a $ZrO_x$ metal oxide is supported on a $SiO_2$ support material.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| 1H NMR | Proton Nuclear Magnetic Resonance |
| GC | Gas Chromatography |
| HDPE | High density polyethylene |
| NMR | Nuclear Magnetic Resonance |
| PE | polyethylene |
| PP | polypropylene |
| sccm | standard cubic centimeters per minute |
| TGA | Thermogravimetric Analysis |
| wt. % | weight percent |

DESCRIPTION OF EMBODIMENTS OF THE DISCLOSURE

The present disclosure provides improved methods for recycling polyolefin-based materials into commercially important raw material using supported metal oxides. Specifically, at least one supported metal oxide is mixed with a polyolefin-based feed stream comprising at least one polyolefin-based material in a depolymerization unit. A thermolysis reaction is performed in the depolymerization unit, wherein the supported metal oxide initiates the depolymerization of the polyolefin-based material to generate a usable liquid product with minimal branching or aromatics formation.

There are many advantages of using supported metal oxides to improve the thermal depolymerization of the polyolefins. First, the presence of the supported metal oxide increases the depolymerization rate at which the liquid products are first formed in the depolymerization unit, compared to depolymerization without a supported metal oxide. This results in a decrease in the residence time of the polyolefin feed stream in the depolymerization unit, which leads to reduced energy costs. In some embodiments, the depolymerization rate increases by at least 20%, compared to depolymerization reactions without the supported metal oxide. In other embodiments, the depolymerization rate increases by at least 40%, compared to depolymerization reactions without the supported metal oxide.

Another advantage is the customizability of the supported metal oxide selection to the composition of the polyolefin feed stream. While all supported metal oxides of the presently described methods facilitate improvements in the thermal depolymerization process, the degree of improvement can vary between the selected metal oxides, the support material, and the composition of the polyolefin feed. As such, combinations of metal oxides and support materials may be utilized to process various combinations of polyolefins in the feed stream. This is especially important when treating post-consumer polyolefin waste as the composition of this particular waste differs both regionally and seasonally. Regardless of the metal oxide(s) and support material(s) used, however, the resulting depolymerization products will be similar to polyolefin waste streams depolymerized without a supported metal oxide.

Finally, the supported metal oxides are robust in that they are less likely to be affected by 'poisons' in the polymer feed stream than other traditional depolymerization catalysts.

The supported metal oxides are formed by combining a metal oxide precursor with commonly used support metal oxide materials such as $SiO_2$, $TiO_2$ (both anatase and rutile forms), and $Al_2O_3$; however, the metal oxide and oxide-based support material should not be the same. Any method of synthesizing the supported metal oxides can be used.

In some embodiments, an incipient wetness procedure is used to prepare the supported metal oxides as it is a simple procedure that minimizes the quantity of solvent used to prepare the supported metal oxides. In more detail, a metal oxide precursor solution is prepared by dissolving a metal salt such as nitrate or acetate into a solvent. The volume of solvent is selected to match the pore volume of the support material, such that the solvent just fills the pores of the support. This results in less solvent waste that must be removed during the drying process. Further, the metal loading is controlled by the concentration of metal ions in solvent, which means that the support surface does not play an important role, but merely acts as a physical support. Incipient wetness impregnation is particularly suitable for porous support materials such as the oxides used herein.

Alternatively, the wet impregnation procedure can be used to prepare the supported metal oxides. Wet impregnation can control adsorption, since the solvent volume used is greater than the pore volume of the support material, and only those ions interacting specifically with the surface groups of the support are left on the surface after removal of the solvent by filtration or centrifuging.

Regardless of the method used to form the supported metal oxide, the loading of the metal oxide is between about 0.1 and about 3 mmol/g of support material. Alternatively, the loading of the metal oxide is between about 0.1 and about 1.5 mmol/g of support material, or between about 1.75 and about 3 mmol/g of support material, or between about 1 and about 2.5 mmol/g of support material, or between about 0.5 and about 1 mmol/g of support material, or about 1 mmol/g of support material.

Any known metal oxide precursor can be used in the supported metal oxide, including those containing metals from Groups 2-8 and 11-16, as well as the lanthanoids and actinoids. In some embodiments, the metal oxide precursor a nitrate or acetate.

In some embodiments, the supported metal oxide can have $ScO_x$, $ZrO_x$, $WO_x$, $MnO_x$, $NiO_x$, and/or $InO_x$ metal oxides on $SiO_2$, $TiO_2(a)$, $TiO_2(r)$ or $Al_2O_3$ support material. Exemplary metal oxides for use in the present methods include $MnO_2$, $WO_2$, $WO_3$, $In_2O_3$, $Sc_2O_3$, $Ni_2O_3$, or combinations thereof on any support material. Alternatively, the supported metal oxide can be $ZrO_x$ on a $SiO_2$ support, $In_x$ on a $TiO_2(r)$ or a $TiO_2(a)$ support, $WoO_x$ on a $SiO_2$ support, $ScO_x$ on a $SiO_2$ support, $MnO_x$ on a $SiO_2$ support, and/or $NiO_x$ on a $SiO_2$ support. In some embodiments, the supported metal oxide is $ZrO_x$ on a $SiO_2$ support or $InO_x$ on a $TiO_2(r)$ support.

The presently described methods can be applied to a feed stream comprising material with a single polyolefin component, or a mixture of polyolefin components in any amount. Any polyolefin can be present in the feed stream, including but not limited to, polyethylene (both high and low density), polypropylene, ethylene-propylene copolymers, polybutene-1, polyisobutene, and copolymers thereof. Further, the waste is not limited to any particular form so films, foams, textiles or other shaped material can be treated with the described methods. The feed can contain post-consumer polyolefin waste, post-industrial polyolefin wastes, or both post-industrial and post-consumer polyolefin waste.

The polyolefin-based material, combined with the selected supported metal oxides(s), will be treated in depolymerization units with temperatures between about 200 and about 600° C. Alternatively, the temperature of the depolymerization unit will be between about 225 and about 500° C. In yet another alternative, the temperature of the depolymerization unit will be between about 250 and about 450° C., or about 400° C. The polyolefin feed stream will be treated in batches in the depolymerization unit due to the residence time needed to fully depolymerize the stream. The estimated residence time for each batch will be between about 30 to about 180 minutes, depending on the heat transferability of the depolymerization unit. Alternatively, the estimated residence time is about 60 minutes.

As the supported metal oxide is acting as an initiator to the depolymerization reaction, amounts of less than 20% by weight of the batch polyolefin feed stream are needed. Alternatively, the amount of supported metal oxide is between >0 and about 15% by weight of the batch polyolefin feed stream, or between about 7.5 and about 18%, or between about 12.5 and <20%, or between about 7.5 and about 12.5%, or between about 2% and about 2.5%. In yet another alternative, the supported metal oxide is present in an amount of 2.5% or 5% or 10% or 15% by weight of the batch polyolefin feed stream.

The presently disclosed methods are exemplified with respect to the examples below. However, these are exemplary, and the present disclosure can be broadly applied to any polyolefin feed and supported metal oxide combination. The following examples are intended to be illustrative, and not unduly limit the scope of the appended claims.

Examples

The following examples are included to demonstrate embodiments of the appended claims. Those of skill in the art should appreciate that many changes can be made in the specific embodiments which are disclosed and still obtain a like or similar result without departing from the spirit and scope of the disclosure herein. In no way should the following examples be read to limit, or to define, the scope of the appended claims.

TGA Depolymerization

A series of polyolefin feed streams were processed using Thermogravimetric Analysis (TGA) as the depolymerization unit. The feed consisted of a single polyolefin in the feed was high density polyethylene ("HDPE", grade ACP9255, a LyondellBasell product). A series of supported metal oxides were prepared using the incipient wetness procedure having a concentration of 1 mmol per gram of support. Uniform samples were prepared with 5 g of the HDPE melt-compounded the supported metal oxide in an amount of 10% by weight (~0.5 g), in a HAAK MiniCTW compounder at 200° C. and 200 RPM for 5 minutes.

For the TGA thermolysis reactions, the uniform HDPE and supported metal oxide mixtures were heated under nitrogen at 10K/min to the desired depolymerization temperature in a Mettler Toledo TGA/DSC 3+(Mettler Toledo, Columbus, Ohio) and held for 1 hour. For this example, a depolymerization temperature of 400° C. was used. The depolymerization half time at a specific temperature, defined as the time needed to achieve a 50% loss of mass, was recorded directly if the value was less than 60 min, or determined under the assumption of first order decomposition kinetics as $t_{1/2}=0.693/k$, where k is the first order rate constant determined graphically using a $Ln(C_0/C)$ vs time plot.

The depolymerization half time is relative to the residence time needed in a large scale depolymerization unit. The shorter the half time, the shorter the residence time for a batch of a polymer feed in a depolymerization unit, and the higher the depolymerization rate. The results for this depolymerization process are shown in Table 1.

Comparative Example 1 (Comp. Ex. 1) was depolymerized with no supported metal oxide. The depolymerization half time for Comp. Ex. 1 was 356.3 minutes at 400° C. The addition of a supported metal oxide reduced the half time for this HDPE feed. The greatest reduction was seen with $ZrO_x/SiO_2$. An addition of 10% by weight of this supported metal oxide to the HDPE feed resulted in a reduction of about 61%, with a half time of 141 min. All of the supported metal oxide samples, except for $NiO_x/SiO_2$, resulted in a reduction of greater than 40% of the half time. Thus, each supported metal oxide was able to demonstrate an improvement on the depolymerization rate, which translates to less time being needed for depolymerization in a larger scaled reactor.

TABLE 1

Results from TGA depolymerization of HDPE with supported metal oxide at 400° C.

| | Supported Metal Oxide | Half Time (min) | Half Time reduction |
|---|---|---|---|
| Comp. Ex. 1 | none | 365.5 | n/a |
| Ex. 1 | $InOx/TiO_2(r)$ | 147 | 59.8% |
| Ex. 2 | $ZrO_x/SiO_2$ | 141 | 61.4% |
| Ex. 3 | $WO_x/SiO_2$ | 158 | 56.8% |
| Ex. 4 | $InOx/TiO_2(a)$ | 198 | 45.8% |
| Ex. 5 | $ScO_x/SiO_2$ | 217 | 40.6% |
| Ex. 6 | $MnO_x/Al_2O_3$ | 217 | 40.6% |
| Ex. 7 | $NiO_x/SiO_2$ | 224 | 38.7% |

Other combinations of the metal oxides and support oxide material are expected to reduce the half time of the depolymerization of the HDPE by about 35% to about 65%.

Metal Oxide Loadings

A series of examples with a single polyolefin feed were depolymerized in a quartz tube pyrolysis apparatus with two exemplary supported metal oxides having an increasing amount of metal oxide loading.

As before, the single polyolefin in the feed was HDPE (grade ACP9255, a LyondellBasell product). For the examples, 5 g of this HDPE was mixed with either $InO_x/TiO_2(r)$ or $MnO_x/Al_2O_3$, each having a metal oxide loading between greater than 0 and 2 mmol/g of the catalyst. The depolymerization rate for each loading of each catalyst was compared with a HDPE feed depolymerized without a supported metal oxide.

As shown in the FIGURE, varying the metal oxide loading in the supported metal oxides affected their performance as depolymerization initiators. $InO_x/TiO_2(r)$ outperformed the other catalyst at all tested concentrations of the metal oxide. Further, only about 0.5 mmol of Indium/gram of catalyst was needed for the largest reduction in depolymerization rate. In contrast, lower amounts of Manganese in the $MnO_x/Al_2O_3$ catalyst increased the depolymerization rate above that of HDPE by itself. About 1 mmol of Manganese/gram of catalyst was needed for the largest reduction in depolymerization rate of about 40% (half time of about 220 min) for the $MnO_x/Al_2O_3$ catalyst. Thus, the loading of metal oxide on the support material can be varied and customized for a specific polymer feed to obtain the best depolymerization results.

In view of the above examples, it is clear that the presently described methods of using one or more supported metal oxides as initiators for the depolymerization of polyolefins streams can provide a lower energy efficiency (i.e. more cost effective) by increasing the rate of depolymerization by at least 20% greater compared to methods without the use of a supported metal oxide.

What is claimed is:

1. A method of depolymerizing polyolefins comprising:
    a) adding a polyolefin-based feed stream and at least one supported metal oxide to a reactor heated to a temperature between about 200 and about 600° C.; and
    b) reacting said polyolefin-based feed stream with said at least one supported metal oxide to depolymerize said polyolefin-based feed stream;
    wherein the at least one supported metal oxide has a metal oxide loading of 0.1 to 3 mmol/g of support material, and
    wherein the at least one supported metal oxide is present in an amount between greater than 0% and about 20% by weight of the polyolefin-based feed stream.

2. The method of claim 1, wherein the metal oxide in said at least one supported metal oxide is $ScO_x$, $ZrO_x$, $WO_x$, $MnO_x$, $NiO_x$, or $InO_x$.

3. The method of claim 1, wherein the support in said at least one supported metal oxide is $SiO_2$, $TiO_2(a)$, $TiO_2(r)$ or $Al_2O_3$.

4. The method of claim 1, wherein said at least one supported metal oxide is chosen from a group consisting of $ZrO_x/SiO_2$, $InO_x/TiO_2(r)$, $InO_x/TiO_2(a)$, $WoO_x/SiO_2$, $ScO_x/SiO_2$, $MnO_x/SiO_2$, and $NiO_x/SiO_2$.

5. The method of claim 1, wherein said polyolefin-based feed stream is a low density polyethylene, a high density polyethylene, a polypropylene, or a combination thereof.

6. The method of claim 1, wherein said polyolefin-based feed stream is post-consumer waste.

7. The method of claim 1, wherein said polyolefin-based feed stream is post-industrial waste.

8. The method of claim 1, wherein said polyolefin-based feed stream comprises both post-industrial waste and post-consumer waste.

9. The method of claim 1, wherein the at least one supported metal oxide has a metal oxide loading of 0.1 to 2.5 mmol/g of support material, and wherein the at least one supported metal oxide is present in an amount between about 2.5 and 15% by weight of the polyolefin-based feed stream.

10. The method of claim 1, wherein the at least one supported metal oxide is present in an amount between about 2.5 and 15% by weight of the polyolefin-based feed stream.

11. The method of claim 1, wherein the at least one supported metal oxide is present in an amount of about 10% by weight of the polyolefin-based feed stream.

12. A method of depolymerizing a polyolefin-based feed stream comprising:
    a) adding a polyolefin-based feed stream and at least one supported metal oxide in a reactor at a predetermined temperature, wherein the at least one supported metal oxide has a metal oxide loading of 0.1 to 3 mmol/g of support material, and wherein the at least one supported metal oxide is present in an amount between greater than 0% and about 20% by weight of the polyolefin-based feed stream; and
    b) reacting said polyolefin-based feed stream with said at least one supported metal oxide to depolymerize said polyolefin-based feed stream.

13. The method of claim 12, wherein the at least one supported metal oxide is present in an amount between about 2.5 and 15% by weight of the polyolefin-based feed stream.

14. The method of claim 12, wherein said at least one supported metal oxide is chosen from a group consisting of $ZrO_x/SiO_2$, $InO_x/TiO_2(r)$, $InOx/TiO2(a)$, $WoO_x/SiO_2$, $ScO_x/SiO_2$, $MnO_x/SiO_2$, or combinations thereof.

15. The method of claim 14, wherein said at least one supported metal oxide $ZrO_x/SiO_2$ or $InO_x/TiO_2(r)$.

16. The method of claim 12, wherein said polyolefin-based feed stream is a low density polyethylene, a high density polyethylene, a polypropylene, or a combination thereof.

17. The method of claim 12, wherein said polyolefin-based feed stream is post-consumer waste.

18. The method of claim 12, wherein said predetermined temperature is between about 200 and about 600° C.

19. A method of depolymerizing polyolefins comprising:
    a) adding a polyolefin-based feed stream and at least one supported metal oxide to a reactor heated to a temperature between about 200 and about 600° C., wherein the at least one supported metal oxide has a metal oxide loading of 0.1 to 3 mmol/g of support material, wherein the at least one supported metal oxide is present in an amount between greater than 0% and about 20% by weight of the polyolefin-based feed stream, and wherein the polyolefin-based feed stream comprises post-industrial waste, post-consumer waste, or both; and
    b) reacting said polyolefin-based feed stream with said at least one supported metal oxide to depolymerize said polyolefin-based feed stream.

20. The method of claim 19, wherein the at least one supported metal oxide is present in an amount between 2 and 15% by weight of the polyolefin-based feed stream.

\* \* \* \* \*

UNITED STATES PATENT AND TRADEMARK OFFICE
CERTIFICATE OF CORRECTION

PATENT NO. : 11,767,408 B2　　　　　　　　　　　　　　　　　　　　　　　Page 1 of 1
APPLICATION NO. : 17/514015
DATED : September 26, 2023
INVENTOR(S) : Nagy et al.

It is certified that error appears in the above-identified patent and that said Letters Patent is hereby corrected as shown below:

In the Specification

In Column 3, Line 27, delete "WoOx/SiO$_2$," and insert -- WoO$_x$/SiO$_2$, --, therefor In Column 6, Line 50, delete "In$_x$" and insert -- InO$_x$ --, therefor Signed and Sealed this
Fourth Day of February, 2025

Coke Morgan Stewart
*Acting Director of the United States Patent and Trademark Office*